United States Patent
Shibazaki et al.

[11] Patent Number: 6,053,835
[45] Date of Patent: Apr. 25, 2000

[54] DIFFERENTIAL GEAR LUBRICATION STRUCTURE

[75] Inventors: Kouichi Shibazaki; Kazumi Takagi, both of Saitama, Japan

[73] Assignee: Honda Giken Kogyo Kabushiki Kaisha, Tokyo, Japan

[21] Appl. No.: 09/324,837

[22] Filed: Jun. 3, 1999

[30] Foreign Application Priority Data

Jun. 9, 1998 [JP] Japan .................................. 10-160604

[51] Int. Cl.⁷ ................................................. F16H 57/64
[52] U.S. Cl. ............................................................ 475/160
[58] Field of Search .............................................. 475/160

[56] References Cited

U.S. PATENT DOCUMENTS 5,624,343  4/1997  Krisher .................................... 475/160

FOREIGN PATENT DOCUMENTS 8-170717  7/1996  Japan .

*Primary Examiner*—Dirk Wright
*Attorney, Agent, or Firm*—Armstrong, Westerman, Hattori, McLeland & Naughton

[57] ABSTRACT

A tubular member is disposed between a pair of drive pinions at the right and left and shaft insertion holes for insertion of the pinion shafts for axial support of the differential pinions are formed in the tubular member. First lubrication grooves for induction of the lubricating oil to the shaft insertion holes are formed on the inner circumferential surface of the tubular member. Second lubrication grooves extending from inside positions of the first lubrication grooves in radial directions of the tubular member toward the axial supporting parts of the differential pinions to reach the attachment parts of washers on the rear surfaces of the differential pinions are formed on the outer circumferential surfaces of the pinion shafts. The lubricating oil collected by the tubular member is supplied efficiently to the axial supporting parts of the differential pinions with guidance of the first lubrication grooves and the second lubrication grooves.

6 Claims, 4 Drawing Sheets

DIFFERENTIAL GEAR LUBRICATION STRUCTURE

BACKGROUND OF THE INVENTION

1. Field of the Invention

The present invention relates to a differential gear lubrication structure. A differential gear case has a pair of boss parts for axial support of a pair of output shafts disposed coaxially with each other. A pair of drive pinions that are combined respectively with output shafts by means of splines and a plurality of differential pinions that engage with the drive pinions are housed in the differential gear case.

The differential pinions are axially supported by pinion shafts which are supported by the differential gear case.

The present application is based on Japanese Patent Application No. Hei. 10-160604, which is incorporated herein by reference.

2. Description of the Related Art

Conventionally known is a gear lubrication structure in Japanese Patent Publication No. Hei. 8-170717, wherein lubricating oil from oil sumps respectively provided at outer ends of the boss parts is supplied to spaces between both the drive pinions via first lubricating oil paths formed between the inner circumferential surfaces of the boss parts and the output shafts and second lubricating oil paths formed between the inner circumferential surfaces of the drive pinions and the output shafts so as to lubricate lubrication points around the pinion shafts, especially the axial supporting parts of the differential pinion shafts.

In the above-described conventional structure, in spite that lubricating oil that is supplied through the second lubricating oil paths is designed so as to flow along the outer circumferential surfaces of the pinion shafts and to the axial supporting parts of the differential pinion shafts, a considerable amount of lubricating oil does not flow along the outer circumferential surface of the pinion shafts but scattered outward and thus further increase in the lubrication efficiency is in demand.

SUMMARY OF THE INVENTION

The present invention considers the above-described problem through providing a lubrication structure wherein lubricating oil is supplied to the axial supporting parts of the differential pinion shafts with a higher efficiency.

A differential gear comprises a differential gear case having a pair of boss parts for axial support of a pair of output shafts disposed coaxially with each other, a pair of drive pinions combined respectively with the output shafts by means of splines, a plurality of differential pinions engaging with the drive pinions, and pinion shafts supported by the differential gear case to axially support the differential pinions. In a differential gear lubrication structure for the above lubrication structure according to the present invention, an oil sump is disposed disposed at an outer end of the boss part to supply lubricating oil, a first lubricating oil path is formed between an inner circumferential surface of the boss part and the output shaft, and a second lubricating oil path is formed between an inner circumferential surface of the drive pinion and the output shaft, wherein the lubricating oil from the oil sump is supplied to a space between pair of the drive pinions via the first lubricating oil path and the second lubricating oil path. Further, a tubular member has shaft insertion holes for insertion of the pinion shafts being provided between pair of the driving pinions, and a first lubrication groove is formed on an inner circumferential surface of the tubular member for leading the lubricating oil from the second lubricating oil path to the shaft insertion hole.

Although the lubricating oil spouted from the second lubricating oil paths is scattered outward by centrifugal force due to revolutions of the driving pinions, the lubricating oil is caught and collected by the tubular member. The collected lubricating oil is led by the first lubrication grooves on the inner circumferential surface of the tubular member to the shaft insertion hole and then, running over the outer circumferential surface of the pinion shafts inserted here, supplied to the axial supporting parts of the differential pinions. Thus, the lubricating oil is supplied efficiently to the axial supporting parts of the differential pinions.

Lubrication efficiency rate at the axial supporting parts of the differential pinion can be enhanced by formation of second lubrication grooves on the outer circumferential surfaces of the pinion shafts so as to run from parts positioned inside the aforenamed first lubrication grooves in radial directions of the tubular member toward the axial supporting parts of the differential pinions.

Features and advantages of the invention will be evident from the following detailed description of the preferred embodiments described in conjunction with the attached drawings.

DETAILED DESCRIPTION OF THE PREFERRED EMBODIMENTS

Figure 1:
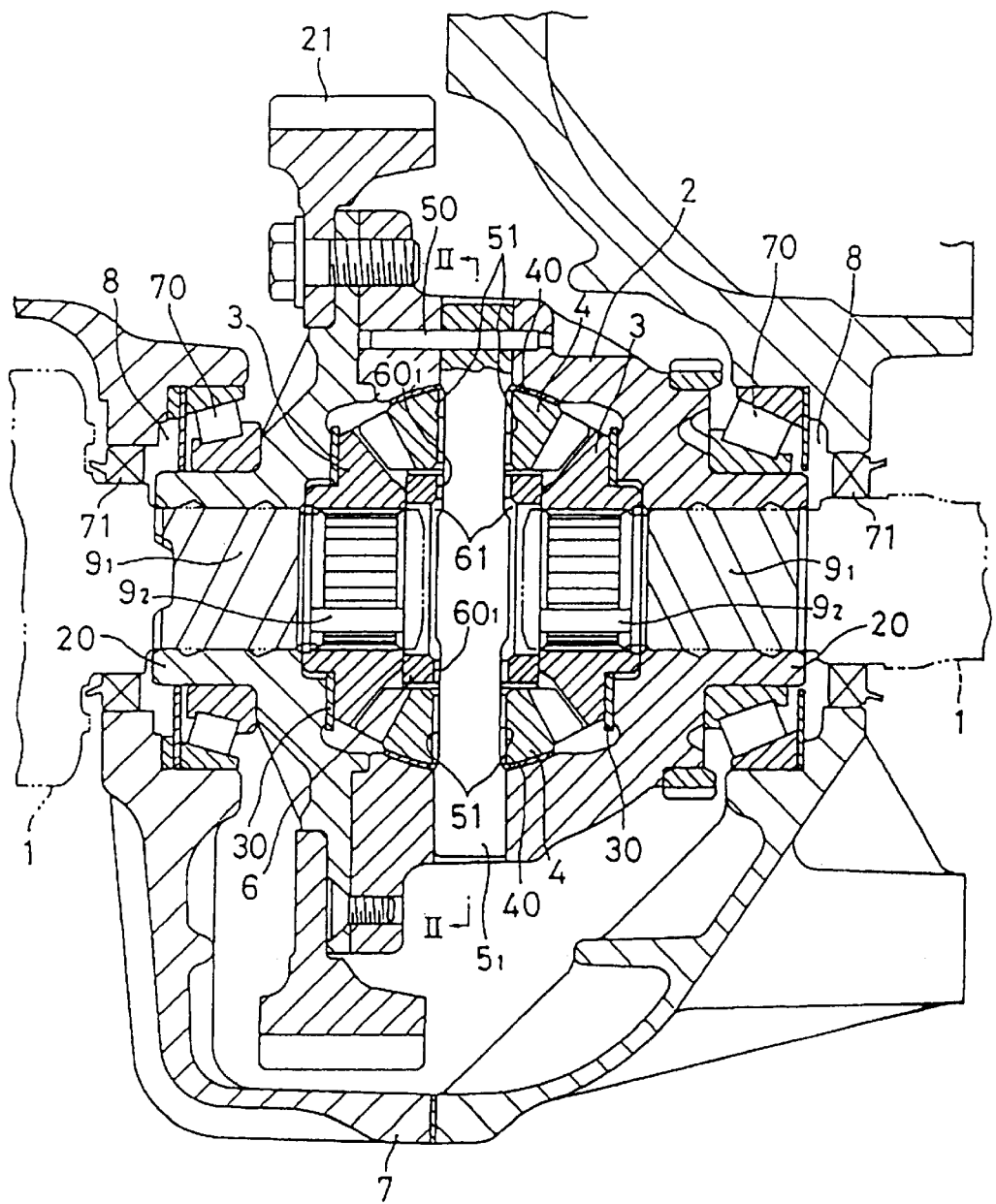
FIG. 1 is a vertical section drawing of a differential gear with adoption of the lubrication structure according to the present invention.
Figure 2:
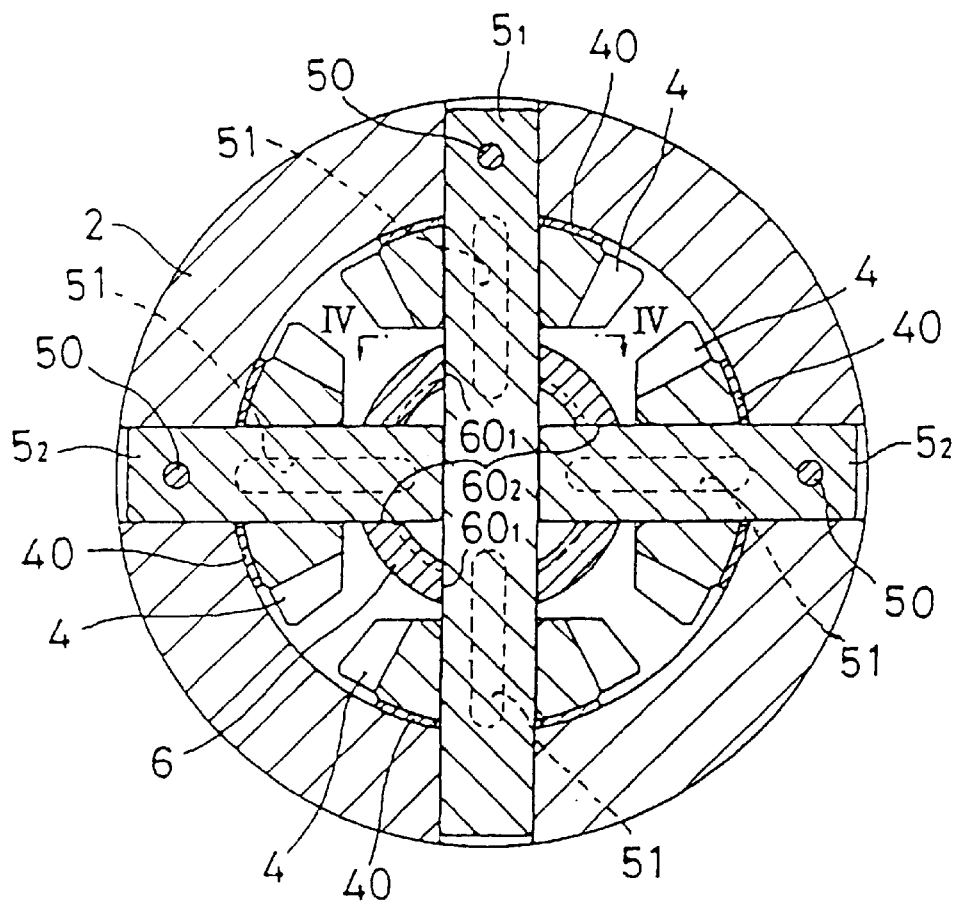
FIG. 2 is a sectional drawing along line II—II in FIG. 1.

FIG. 1 shows a differential gear unit for vehicles. Inside a differential gear case 2 which has a pair of boss parts 20, 20 on the right and left for axial support of a pair of output shafts 1, 1 disposed coaxially with each other. as right and left shafts, the differential gear unit houses a pair of drive pinions 3, 3 on the right and left which have bevel gears that are respectively combined with both the output shafts 1, 1 by splines and a plurality of differential pinions 4 which have bevel gears that mesh with both the drive pinions 3. The four differential pinions 4 in the present embodiment, as shown in FIG. 2, are disposed at equal intervals in a circumferential direction of the differential gear case 2, and the two differential pinions 4 which confront each other in a predetermined first diametric direction of the differential gear case 2 are axially supported by a first pinion shaft $5_1$ which is supported at both ends thereof by a circumferential wall part on both sides in the first diametric of the differential gear case 2. The other two differential pinions 4, 4 which confront each other in a second diameter direction that is orthogonal to the first diameter direction are axially supported by a pair of second pinion shafts $5_2$, $5_2$ which are supported at one end thereof respectively by a circumferential wall part on one side in the second diameter direction of the differential gear case 2 and by the circumferential wall part on the other side.

The pinion shafts $5_1$ and $5_2$ are fastened to the differential gear case 2 by fixing pins 50 so as to prevent them from revolving or coming off. Additionally, a tubular member 6 for slight insertion of inner ends of the right and left output shafts 1 is provided between the right and left drive pinions 3, and first shaft insertion holes $60_1$, $60_1$ are formed in the aforenamed circumferential wall parts on both sides in the first diametrer direction of this tubular member 6 for insertion of the first pinion shaft $5_1$. Second shaft insertion holes $60_2$, $60_2$ are formed respectively in the circumferential wall part on one side and the circumferential wall part on the other side in the aforenamed second diameter direction of the tubular member 6 for insertion of inner end parts of the second pinion shaft $5_2$ for the purpose of ensuring the support rigidity of the second pinion shaft $5_2$ which is supported by the differential gear case 2 with a cantilever manner.

The differential gear case 2 is axially supported by a transmission case 7 at the right and left boss parts 20 via bearings 70, wherein an input gear 21 that meshes with a final gear (not shown in the figure) of a speed change gear mechanism inside the transmission case 7 is connected to the differential gear case 2 so than the driving torque from the speed change gear mechanism is transmitted to the right and left output shafts 1, 1 via the differential gear case 2 and the differential pinions 4 in such a state as to allow difference in the revolutions of the both.

Inside the transmission case 7, an oil seal 71 is provided at an outside position in the axial direction of each of the aforenamed bearings 70, and the oil seal 71 defines an oil sump 8 at an outer end of each of the boss parts 20. First lubricating oil paths $9_1$ which comprise spiral grooves on the inner circumferential surfaces of the boss parts 20 are formed between the inner circumference of the boss parts and the output shafts. Second lubricating oil paths $9_2$ which consist of non-splined parts of the splines on the inner circumferential surfaces of the driving pinions 3 are formed between the inner circumference of the driving pinions 3 and the output shafts 1. The lubricating oil from the oils sumps 8 is led to the inside of the boss parts in axial direction via the first lubricating oil paths $9_1$ and some of the lubricating oil is supplied to attachment surfaces of washers 30 on the rear surfaces of the driving pinions 3 through clearances between the inner end surfaces of the boss parts 20 and the driving pinions 3 while supplying the remainder to the inside of the driving pinions 3 through the second lubricating oil paths $9_2$.

Figure 3:
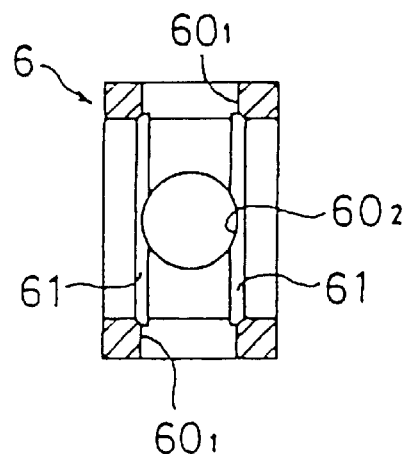
FIG. 3 is a vertical section drawing of a tubular member.

Although the lubricating oil spouted from the second lubricating oil paths $9_2$ is scattered outward in radial directions by centrifugal force due to revolutions while, running through the second lubricating oil paths $9_2$, the lubricating oil is caught and collected efficiently by the aforenamed tubular member 6. As shown in FIG. 3, a pair of first lubrication grooves 61, 61 which extend in circumferential directions and come into contact with the shaft insertion holes $60_1$, and $60_2$ on one side and the other side in the axial direction of the tubular member 6 are formed on the inner circumferential surface of the tubular member 6. The lubricating oil collected by the tubular member 6 is led to the shaft insertion holes $60_1$ and $60_2$ through the first lubrication grooves 61, 61.

A pair of second lubrication grooves 51 which run from inside position of the first lubrication grooves 61 in radial directions of the tubular member 6 toward the axial supporting parts of the differential pinions 4 to reach the attachment parts of washers 40 on the rear surfaces of the differential pinions 4 are formed on the outer circumferential surfaces of the pinion shafts $5_1$ and $5_2$ in such a manner as to intersect with the pair of first lubrication grooves 61 on the tubular member 6 so that lubricating oil from the first lubrication grooves 61 on the tubular member 6 will flow along the second lubrication grooves 51 of the pinion shafts and be led to the axial supporting part of the differential pinions 4 and to the attachment parts of the washers 40. Thus, owing to the lubricating oil collective effect of the tubular member 6 and the rubricating oil induction effect of the first lubrication grooves 61 of the tubular member 6 and the second lubrication grooves 51 of the pinion shafts $5_1$ and $5_2$, lubricating oil from the second lubricating oil paths $9_2$ is supplied efficiently to the axial supporting parts of the differential pinions 4 and to the attachment parts of the washers 40.

Figure 4:
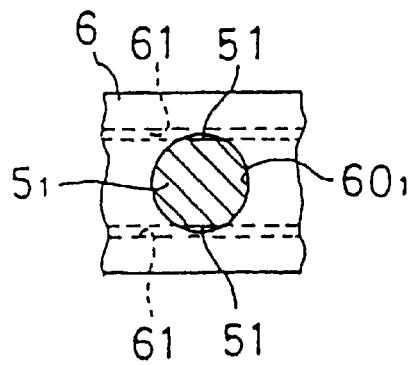
FIG. 4 is a sectional drawing along line IV—IV in FIG. 2.

Although chamfered parts on the outer circumferential surfaces of the pinion shafts $5_1$ and $5_2$ constitute the second lubrication grooves 51 of the pinion shafts $5_1$ and $5_2$ in this mode of embodiment of, as shown in FIG. 4, it is also possible that concave grooves cut on the outer surfaces of the pinion shafts $5_1$ and $5_2$ constitute the second lubrication grooves 51.

Figure 5:
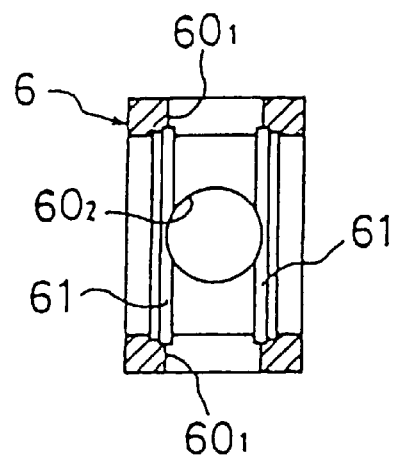
FIG. 5 is a vertical section drawing of a tubular member according to the second embodiment of the present invention.
Figure 6:
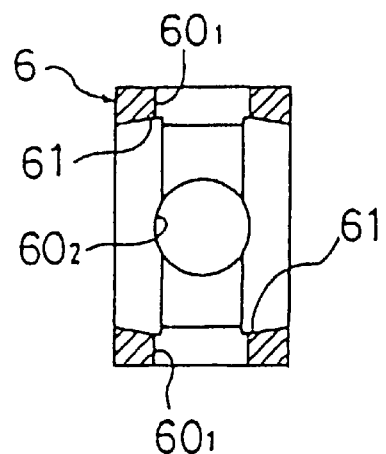
FIG. 6 is a vertical section drawing of a tubular member according to the third embodiment of the present invention.
Figure 7:
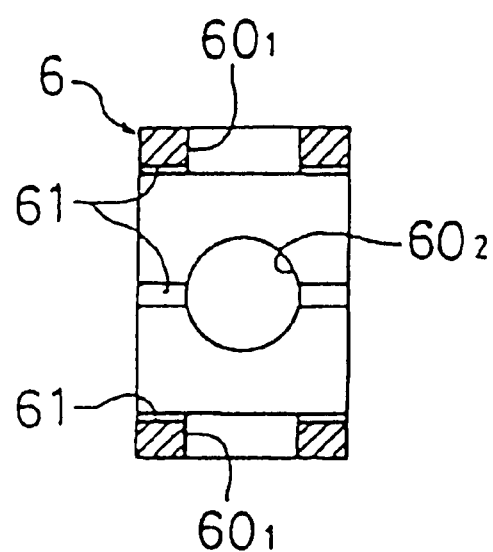
FIG. 7 is a vertical section drawing of a tubular member according to the fourth embodiment of the present invention.

The first lubrication grooves 61 of the tubular member 6 are not limited to the above-described mode of embodiment but available in other modes; for example, as shown in FIG. 5, a stepped configuration which is composed of deep grooves that come into contact with the shaft insertion holes $60_1$ and $60_2$ and shallow grooves on the outer side thereof in the axial direction, or, as shown in FIG. 6, a tapered configuration wherein the depth of grooves are reduced without steps toward the outer ends of the tubular member 6 in the axial direction can facilitate induction of lubricating oil into the shaft insertion holes and prevention of the counterflow to result with further enhancement of the lubricating efficiency. Another alternative is, as shown in FIG. 7, first lubrication grooves 61 which are formed on the inner circumferential surface of the tubular member 6 so as to extend in such an axial direction as to intersect the shaft insertion holes $60_1$ and $60_2$.

Although the description above is on the differential gear which comprises four differential pinions 4 has been described above, the present invention is applicable in the same way to other differential gears which comprises only two differential pinions 4 that are axially supported by the first pinion shaft $5_1$.

As described above, according to the present invention, the lubricating oil collective effect of the tubular member and the lubricating oil induction effect of the lubrication grooves supplies lubricating oil efficiently to the axial supporting parts of the differential pinion and thus the lubrication efficiency is enhanced.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A differential gear lubrication structure for a differential gear comprising a differential gear case having a pair of boss parts for axial support of a pair of output shafts disposed coaxially with each other, a pair of drive pinions combined respectively with the output shafts by means of splines, a plurality of differential pinions engaging with the drive pinions, and pinion shafts supported by the differential gear case to axially support the differential pinions, said lubrication structure comprising:

- an oil sump disposed at an outer end of the boss part to supply lubricating oil;
- a first lubricating oil path being formed between an inner circumferential surface of the boss part and the output shaft;
- a second lubricating oil path being formed between an inner circumferential surface of the drive pinion and the output shaft, wherein the lubricating oil from the oil sump is supplied to a space between pair of the drive pinions via said first lubricating oil path and said second lubricating oil path;
- a tubular member having shaft insertion holes for insertion of the pinion shafts being provided between pair of the driving pinions; and
- a first lubrication groove being formed on an inner circumferential surface of said tubular member for leading the lubricating oil from said second lubricating oil path to the shaft insertion hole.

2. A differential gear lubrication structure according to claim 1, further comprising a second lubrication groove being formed on an outer circumferential surface of the pinion shaft so as to extend from a part positioned inside said first lubrication grooves in a radial direction of said tubular member toward an axial supporting part of the differential pinions.

3. A differential gear lubrication structure according to claim 2, wherein said second lubrication groove is formed of a chamfered part on the outer circumferential surface of the pinion shaft.

4. A differential gear lubrication structure according to claim 1, wherein said first lubrication groove has a deep groove coming into contact said shaft insertion hole and a shallow groove formed on an outer side of said deep groove.

5. A differential gear lubrication structure according to claim 1, wherein said first lubrication groove is configured so that a depth of the groove is gradually reduced toward the outer end of said tubular member.

6. A differential gear lubrication structure according to claim 1, wherein said first lubrication groove is configured so as to extend an axial direction of said tubular member as to intersect the shaft insertion hole.

* * * * *